United States Patent
Saarela et al.

(10) Patent No.: US 7,874,082 B2
(45) Date of Patent: Jan. 25, 2011

(54) METHOD AND APPARATUS FOR DRYING BULK MATERIAL, ESPECIALLY BARK, SAWDUST, PRETREATED SLUDGE OR A MIXTURE THEREOF

(75) Inventors: Esko Saarela, Rauma (FI); Juhani Kinnunen, Rauma (FI)

(73) Assignee: UPM-Kymmene Corporation, Helsinki (FI)

( * ) Notice: Subject to any disclaimer, the term of this patent is extended or adjusted under 35 U.S.C. 154(b) by 367 days.

(21) Appl. No.: 10/576,446

(22) PCT Filed: Oct. 29, 2004

(86) PCT No.: PCT/FI2004/000638

§ 371 (c)(1),
(2), (4) Date: May 18, 2006

(87) PCT Pub. No.: WO2005/043057

PCT Pub. Date: May 12, 2005

(65) Prior Publication Data

US 2007/0028478 A1    Feb. 8, 2007

(30) Foreign Application Priority Data

Oct. 31, 2003    (FI) .................................. 20031586

(51) Int. Cl.
  *F26B 19/00*    (2006.01)
  *F26B 17/12*    (2006.01)

(52) U.S. Cl. ............................. 34/507; 34/513; 34/72; 34/86; 34/203; 34/207; 34/218; 34/236

(58) Field of Classification Search .................... 34/72, 34/86, 507, 509, 513, 514, 203, 207, 218, 34/219, 223, 230, 236
See application file for complete search history.

(56) References Cited

U.S. PATENT DOCUMENTS 2,678,125 A * 5/1954 Bonney, Jr. .................. 198/812

(Continued)

FOREIGN PATENT DOCUMENTS

DE    100 05 165.0    8/2001

(Continued)

*Primary Examiner*—Jiping Lu
(74) *Attorney, Agent, or Firm*—Nixon & Vanderhye P.C.

(57) ABSTRACT

Method and apparatus are provided for drying bulk material, especially bark, sawdust, pretreated sludge or a mixture of these. Also provided are a method and apparatus for cooling waste water produced in a pulp or paper production process. Certain embodiments include a pulp mill, paper mill and a novel way of using a wire. Other embodiments provide for cooling in one and the same heat exchanger the waste water produced in a pulp or paper production process while simultaneously heating the gas that cools the waste water. Heated gas extracted from the heat exchanger is conducted through one or several drying conveyers and through the material to be dried that is conveyed on the drying conveyer so as to dry the material with the heated gas.

13 Claims, 7 Drawing Sheets

SECTION A-A

U.S. PATENT DOCUMENTS

| | | | | |
|---|---|---|---|---|
| 3,591,449 A | * | 7/1971 | Hess et al. | 162/30.1 |
| 4,237,618 A | * | 12/1980 | Maffet | 34/386 |
| 4,253,825 A | * | 3/1981 | Fasano | 34/203 |
| 4,490,924 A | * | 1/1985 | Lambert | 34/216 |
| 4,768,292 A | | 9/1988 | Manzei | |
| 5,343,632 A | * | 9/1994 | Dinh | 34/507 |
| 5,357,881 A | | 10/1994 | Elcik et al. | |
| 5,372,062 A | | 12/1994 | Jonkka et al. | |
| 5,653,872 A | | 8/1997 | Cohan | |
| 5,656,179 A | | 8/1997 | Gehrmann et al. | |
| 6,105,273 A | | 8/2000 | Johanson et al. | |
| 6,471,898 B1 | | 10/2002 | Barre et al. | |

FOREIGN PATENT DOCUMENTS

| | | | |
|---|---|---|---|
| EP | 0 552 583 | | 7/1993 |
| EP | 1 150 083 B1 | | 10/2000 |
| FI | 78020 | | 2/1989 |
| FI | 110310 | | 4/1995 |
| GB | 191510670 | | 7/1915 |
| GB | 283014 | | 1/1928 |
| GB | 832175 | | 4/1960 |
| GB | 2171401 A | * | 8/1986 |

\* cited by examiner

SECTION A-A

SECTION A-A

SECTION B-B

METHOD AND APPARATUS FOR DRYING BULK MATERIAL, ESPECIALLY BARK, SAWDUST, PRETREATED SLUDGE OR A MIXTURE THEREOF

This application is the US national phase of international application PCT/FI2004/000638 filed 29 Oct. 2004 which designated the U.S. and claims benefit of FI 20031586, dated 31 Oct. 2003, the entire content of which is hereby incorporated by reference.

TECHNICAL FIELD OF THE INVENTION

The invention relates to drying of bulk material, in particular bark, sawdust, pretreated sludge or a mixture of these, in accordance with the preambles to the independent claims presented below. Furthermore the present invention relates to a novel way of cooling waste water produced in a production process of pulp or paper. The invention also relates to a novel way of using a wire.

STATE OF THE ART

Bark, sludge, wood chips, sawdust, peat and mixtures of these, among others, are commonly combusted in power stations using solid fuel. High-powered boilers operating in connection with pulp and paper mills commonly use shredded bark from the mill's debarking plant as their primary fuel. The bark is typically dried by pressing it to a dry matter content of approximately 35-45%. Among the bark, there is typically also sawdust from the slasher deck and/or chip screening. Sludge obtained from the mill is often also combusted with bark, which sludge is likewise pretreated by pressing it to increase the dry matter content to approximately 20-35%, for example. It is known, for example, to use various types of piston and roller presses for pressing. In these presses, the matter to be pressed is fed into a space between two surfaces that are pressed against each other. At least one of these surfaces is typically perforated so that water may exit from between the surfaces. Various press structures are described in greater detail, for example, in Finnish patent applications 78020 and 86824.

The energy value of bark and sludge is still relatively low after pressing. They still contain a considerable amount of water, typically 45-80%, heating, vaporising and evaporating of which water consumes thermal energy in the boiler and lowers the efficiency of the combustion process.

The U.S. Pat. No. 6,471,898 describes a method based on high vacuum and low temperature for drying fuel pressed to pellets. In this method, the material to be dried, i.e. pellets, are carried to a belt conveyor located inside a drying space. The belt of the conveyor is manufactured from a gas-permeable material. Non-heated gas, such as air, is sucked through the pellets and the belt from above downwards at a high flow rate (air flow min. 0.0566 m$^3$/min. 6.45 cm$^2$ area), which creates a vacuum below the pellets and draws the water out of the pellets. The water is carried out of the drying space along with the gas flow. A disadvantage of the method is the high air flow, due to the high flow rate, and therefore relatively high power requirement for blowers. The width of the gas-permeable conveyor belt is limited by the strength of the belt material and by the need to maintain a sufficiently high pulling friction between the drive pulley and the belt. These issues limit the drying capacity of the system in practice so that it may not necessarily be sufficient for drying the primary fuel of a large industrial boiler.

Thermal drying methods based on high temperature are known, for example, from the U.S. Pat. Nos. 4,768,292 and 5,653,872. Both publications describe a method for drying pelletized sludge, in which method the flow of pellets is exposed to a heated gas flow by means of a blower. These methods are applicable for a relatively low drying capacity. Also known are thermal drum drying methods, in which the material to be dried is fed into a rotating drum as well as hot gas, temperature of which is for example 500-600° C.

Pulp and paper mills, for example, produce large amounts of waste water that is too warm to be taken out of the mill. It is therefore essential to cool down the waste waters at pulp and paper mills for process-technological and environmental reasons. A great deal of primary energy is currently used for cooling down waste waters at pulp and paper mills, for example in electrically powered coolers. At the same time, the large amount of thermal energy contained in warm waste waters often remains unutilised.

PURPOSE AND DESCRIPTION OF THE INVENTION

The purpose of the invention presented here is to alleviate or even eliminate the above-mentioned problems arising in the state of the art.

The purpose of the invention presented here is particularly to create a method and an apparatus for drying bulk material, especially bark, sawdust, pretreated sludge or a mixture of these, to a high dry matter content while maintaining a high capacity.

Furthermore, another purpose of the invention is to create a method and an apparatus where the energy used for drying bulk material may be obtained from the waste heat contained in the waste waters from a pulp or paper production process.

Further, a purpose of the invention is to create a method and an apparatus by means of which waste waters from a pulp or paper production process may be cooled.

Still a further purpose of the invention is to create a method and an apparatus with which the thermal energy contained in the waste waters of a pulp or paper production process may be utilised.

To accomplish the above mentioned purposes, among others, a method and an apparatus according to the invention are characterised by what is presented in the characterising parts of the independent claims presented below.

The embodiments and advantages mentioned in this text refer, in so far as they are applicable, to all apparatuses and methods according to the invention, as well as to a novel way of using a wire according to the invention, even though this may not always be explicitly stated. Some preferred embodiments of the invention are described in the dependent claims presented below.

A typical apparatus according to the invention for drying bulk material comprises a drying space, which is preferably thermally insulated and at least substantially tight in order to control its internal air flows. An apparatus according to the invention typically contains at least one gas heating device or heat exchanger, by means of which the gas used for drying, for example as air, may be heated. Outside a typical drying space according to the invention are arranged one or several blowers, by means of which gas, preferably air, is blown into the drying space via the gas heating devices and/or cooled gas is sucked out of the drying space, out of one or several drying conveyors located in the drying space. Material to be dried is typically conveyed by means of the said drying conveyor, which may comprise, for example, a chain conveyor equipped with a drive apparatus and a wire resting on the chain conveyor and travelling along the chain conveyor. Heated gas to be blown into the drying space is arranged to travel through said one or several drying conveyors and simultaneously also through the material to be dried, which is located on the drying conveyor. A typical apparatus according to the invention furthermore comprises connectors for carrying waste water produced in a pulp or paper production process to the gas heating device and out of it. In other words, the gas heating device or heat exchanger is typically arranged so that it heats gas with waste water and simultaneously cools the waste water with said gas. The state of the art knows various heat exchangers applicable for use in connection with this invention, and therefore they are not described here in greater detail.

A typical method according to the invention for drying bulk material, especially bark, sawdust, pretreated sludge or a mixture of these in a drying space comprises the following stages:

material to be dried is conveyed by means of one or several drying conveyors located in the drying space,
gas is fed into the drying space,
the gas is heated with the waste water produced in a pulp or paper production process, whereby said waste water is simultaneously cooled,
heated gas is conducted through said one or several drying conveyors carrying the material to be dried and simultaneously also through the material to be dried located on the drying conveyors, whereby the material dries,
gas passed through the drying conveyor is conducted out of the drying space.

A system and a method according to the invention suit particularly well to combining the drying of typical bulk materials used as fuel, such as bark, sawdust, pretreated sludge or a mixture of these and the cooling of waste water produced in a pulp or paper production process.

As regards the use of thermal energy, it is usually most preferable that the gas heating devices, i.e. heat exchangers are located inside the drying space because in this way their waste heat remains inside the drying space. It is also possible to install the heat exchangers or some of them outside the drying space.

The width of the wire and of any chain conveyors used is dictated by the required drying capacity and may, for example, be 2-8 metres. Material to be dried is fed onto the wire at the front end of the drying conveyor throughout its width by a conveyor entering the drying space, for example, or by a small storage silo located above the drying space. For example, if the wire is very wide, the material may be spread on the wire throughout its width by a screw conveyor pivoting, for example, back and forth. It is preferable to use a rotating levelling roller located above the wire at the front end of it for levelling the bed of material on the wire. The structure of the wire represents the prior art known, for example, from paper machines. A wire here refers to a screen fabric or mesh, which is generally used, for example, in the forming section of a paper machine. The wire material may be polyester fabric, for example. A wire may also contain metal threads.

The chain conveyor and the wire typically move relatively slowly, for example at approximately 0.02-0.1 m/s. The chain conveyor preferably comprises two chains, which are under the edges of the wire, and support members located between the chains at predetermined intervals.

The retention time of the fuel to be dried in the drying apparatus depends, among other things, on the material to be dried and its dry matter content. A retention time required for shredded bark, pretreated sludge and mixtures of these is typically approximately 30-50 minutes.

A preferred drying conveyor is typically equipped with a housing so that only the maintenance side, i.e. the return side of the wire is located outside the housing. The drying conveyor is equipped with one or more sets of gas in- and outlet connectors, preferably so that the inlet connector is located on top of the conveyor, from where it leads directly into the drying space, and the outlet connector or connectors are located on the side of the conveyor, from where they lead out of the drying space. Heated gas, such as air, at a preferred temperature of approximately 35-85° C., is conducted by means of blowers from the inlet connector of the drying conveyor over the top side of the bed of material to be dried lying on the wire and further on, through the bed of material and the wire to the underside of the wire, and from there further on through outlet connectors out of the drying space, whereby the heated gas vaporizes the moisture in the material to be dried or the desired portion of it and carries it out of the drying space. Because the wire has a much higher permeability to heated gas than does, for example, a perforated conveyor belt and only a very small reduction is caused in the gas flow, a very high drying efficiency may be achieved with this solution.

If a high drying capacity is required, several drying conveyors may be installed above each other in the drying space, preferably so that the conveyor under each conveyor runs in the opposite direction than the conveyor above it. The front end of the lower conveyor is positioned slightly further out than the back end of the conveyor above, whereby material discharged from the conveyor above falls onto the lower conveyor. The flows of heated gas through the drying conveyor may thereby be realised in various ways either with a parallel or a serial connection. All overlapping drying conveyors may, for example, be built inside a single continuous housing so that the gas can flow in a vertical direction through the entire conveyor structure from the inlet connectors of the topmost conveyor down to the outlet connectors of the lowest conveyor or, alternatively, separate in- and outlet connectors may be arranged for each drying conveyor.

One of the major advantages of a method and apparatus according to the invention is that, as compared with known methods, a remarkably higher dry matter content may be obtained in the fuel, particularly in shredded bark and pretreated sludge and mixtures of these. The achievable dry matter content may, depending on the conditions and fuel, be as high as 60-80%.

A further major advantage of a method and apparatus according to the invention is that, if required, it enables a high drying capacity to be achieved because the width and length of a drying conveyor and the number of overlapping drying conveyors may be increased so that a sufficiently large drying area is achieved on the wire.

A method and apparatus according to the invention is particularly applicable in power stations operating in connection with pulp and paper mills because in such cases waste heat suitable for heating the gas is usually available from the pulp or paper production process. A method and apparatus according to the invention may thereby also be used for cooling waste waters, which in many cases is essential for the further processing of the waste water. Power stations operating in conjunction with pulp and paper mills are often fairly large in terms of output, for example 150-200 MW, thus making the low-capacity fuel drying methods of the prior art poorly applicable for them. Furthermore, a method and apparatus according to the invention does not require pelletizing of fuel in order to function.

A typical method according to the invention for cooling waste water produced in a pulp or paper production process comprises the following stages:
waste water to be cooled is fed to a heat exchanger,
cooled waste water is conducted out of the heat exchanger,
gas for cooling the waste water is fed into the same heat exchanger,
heated gas is conducted out of the heat exchanger,
the heated gas extracted from the heat exchanger is conducted through one or several drying conveyors and through the material to be dried which is carried on a drying conveyor, whereby said material is dried by the heated gas.

A typical apparatus according to the invention for cooling waste water produced in a pulp or paper production process comprises
at least one heat exchanger for cooling waste water,
connectors for guiding waste water to be cooled to the heat exchanger and connectors for guiding cooled waste water out of the heat exchanger,
connectors for guiding cooling gas to the heat exchanger and connectors for guiding heated gas out of the heat exchanger,
a drying space, and one or several drying conveyors arranged therein,
one or several blowers arranged to blow gas via said connectors and heat exchanger into the drying space and/or arranged to suck cooled gas out of the drying space, whereby the heated gas is arranged to pass through the drying conveyor and the material to be dried that is conveyed on the conveyor.

A typical pulp mill or paper mill according to the invention comprises at least one apparatus according to the invention for cooling waste water produced in a pulp or paper production process.

Thus the surprising observation has been made that it is possible and very advantageous to combine the drying of bulk material to be used, for example, as fuel and cooling waste water produced in a pulp or paper production process in a single entity, saving energy and thereby also the environment and costs.

The waste water coolers, i.e. gas heating devices, may be heat exchangers known in the art. The gas flowing through these is heated by warm or hot waste water produced in a pulp or paper production process. The temperature of such waste water may typically be, for example, 80-120° C. Without a solution according to the invention, the waste water would generally have to be cooled in another way prior to further processing or use.

BRIEF DESCRIPTION OF THE FIGURES

In the following, the invention is described in more detail referring to the accompanying schematic drawing, in which.

DETAILED DESCRIPTION OF THE EMBODIMENTS REPRESENTED IN THE FIGURES

Figure 1:
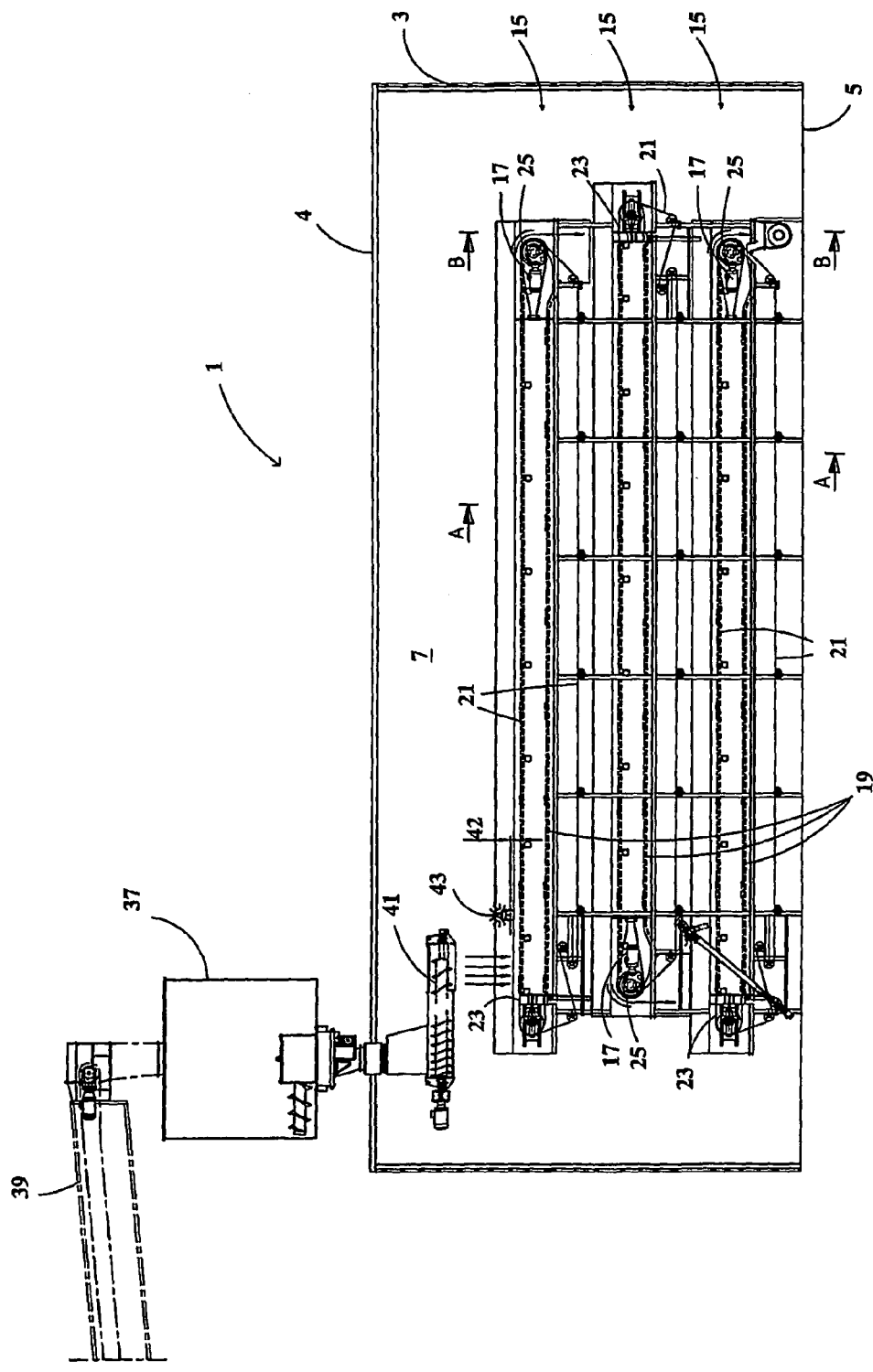
FIG. 1 represents an apparatus according to the invention viewed from the side.
Figure 2:
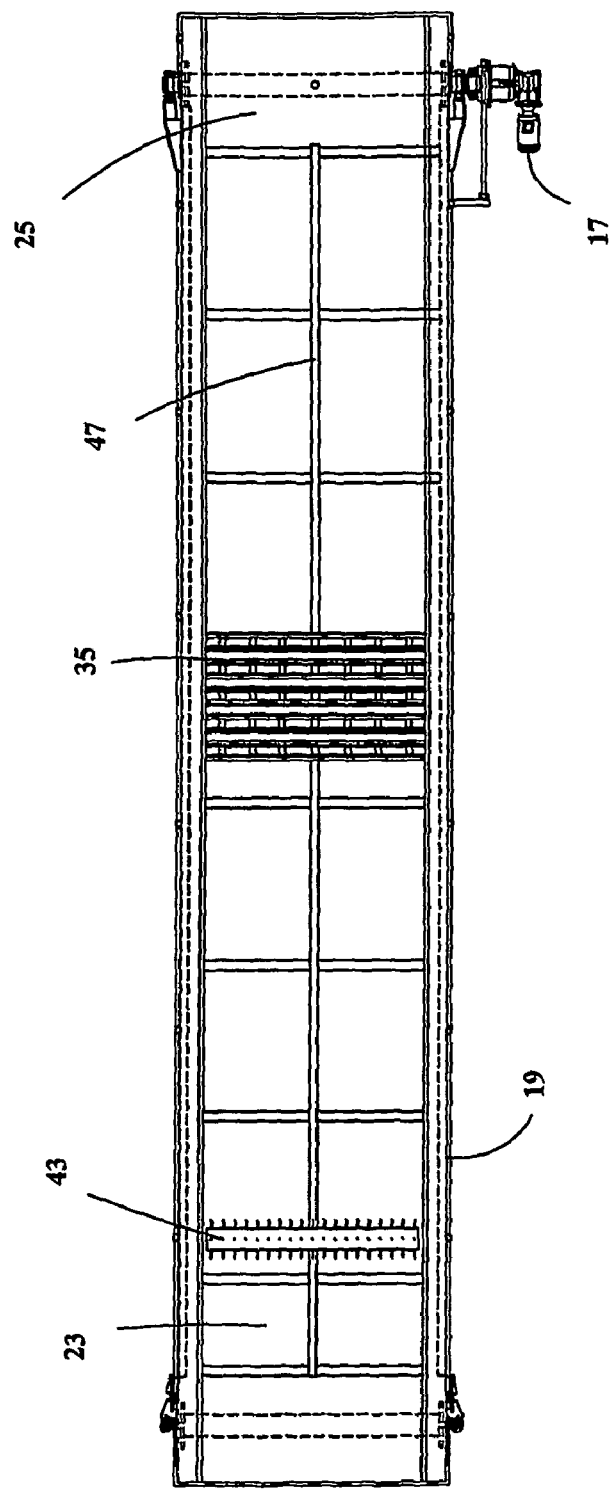
FIG. 2 represents a drying conveyor according to the invention viewed from above.

FIGS. 1-8 represent an apparatus 1 according to the invention. The flow of gas in the apparatus is represented with arrows without reference numbers. A drying space 7 is bounded by walls 3, a ceiling 4 and a floor 5. Outside the drying space 7, there are one or several blowers 9 (FIG. 3), by which gas, preferably air, is blown through pipes 11 via one or several gas heating devices i.e. waste water coolers 13 located inside the drying space, into the actual drying space 7. The gas heating devices 13 may be any state-of-the-art heat exchangers applicable to this purpose. The blowers may also be used for sucking cooled gas out of the drying space 7 (not shown). Three overlapping drying conveyors 15 are arranged in the drying space 7, which drying conveyors consist of a chain conveyor 19 equipped with a drive apparatus, i.e. an electric motor 17, and of a wire 21 supported by the chain conveyor and running on the chain conveyor. The conveyor under each conveyor 15 moves in a direction opposite to the direction of movement of the conveyor above it. The front end 23 of the lower conveyor is located slightly further out than the back end 25 of the higher conveyor, whereby material discharged from the conveyor above falls onto the lower conveyor.

Figure 3:
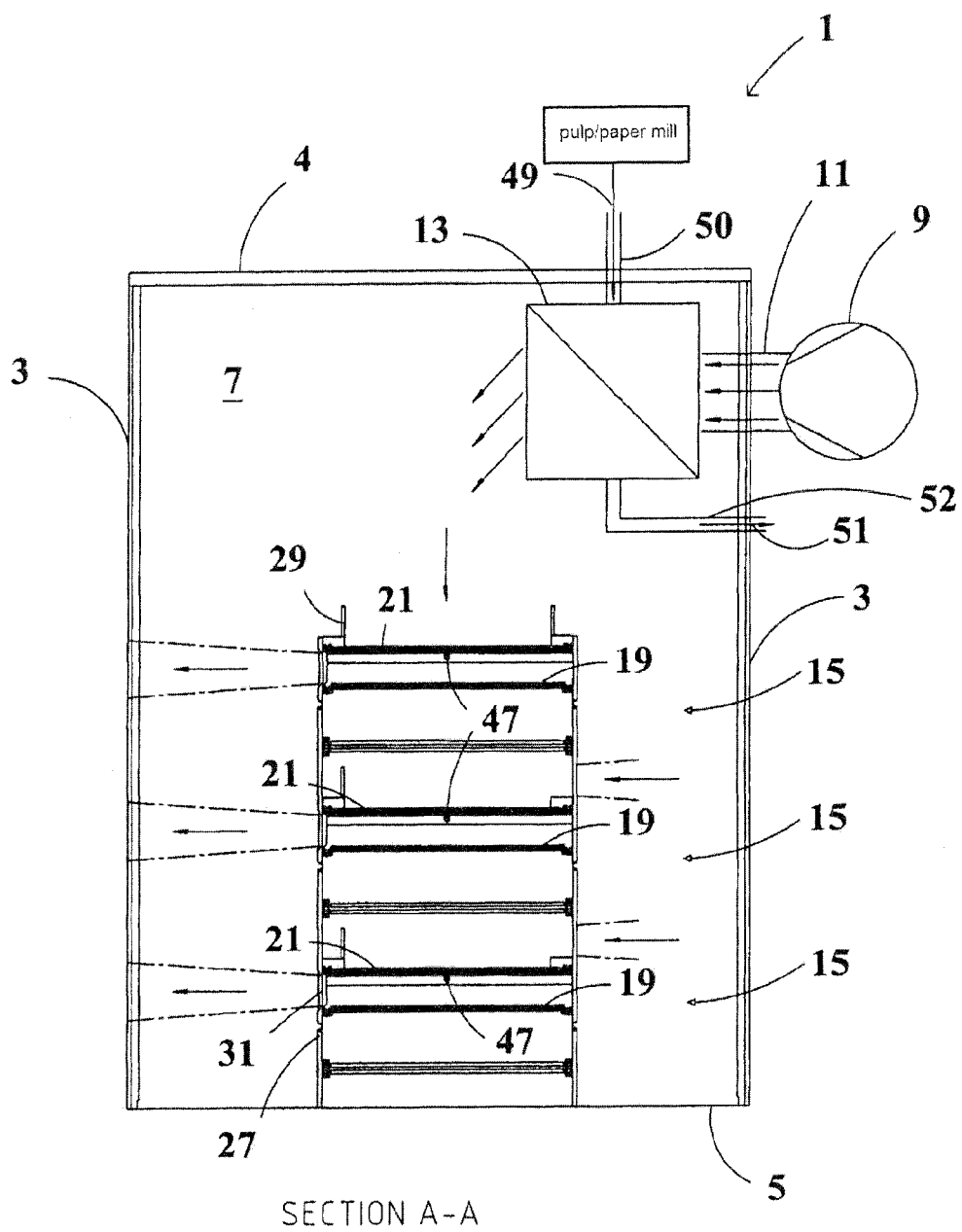
FIG. 3 represents a section of the apparatus in FIG. 1 at a point A.
Figure 4:
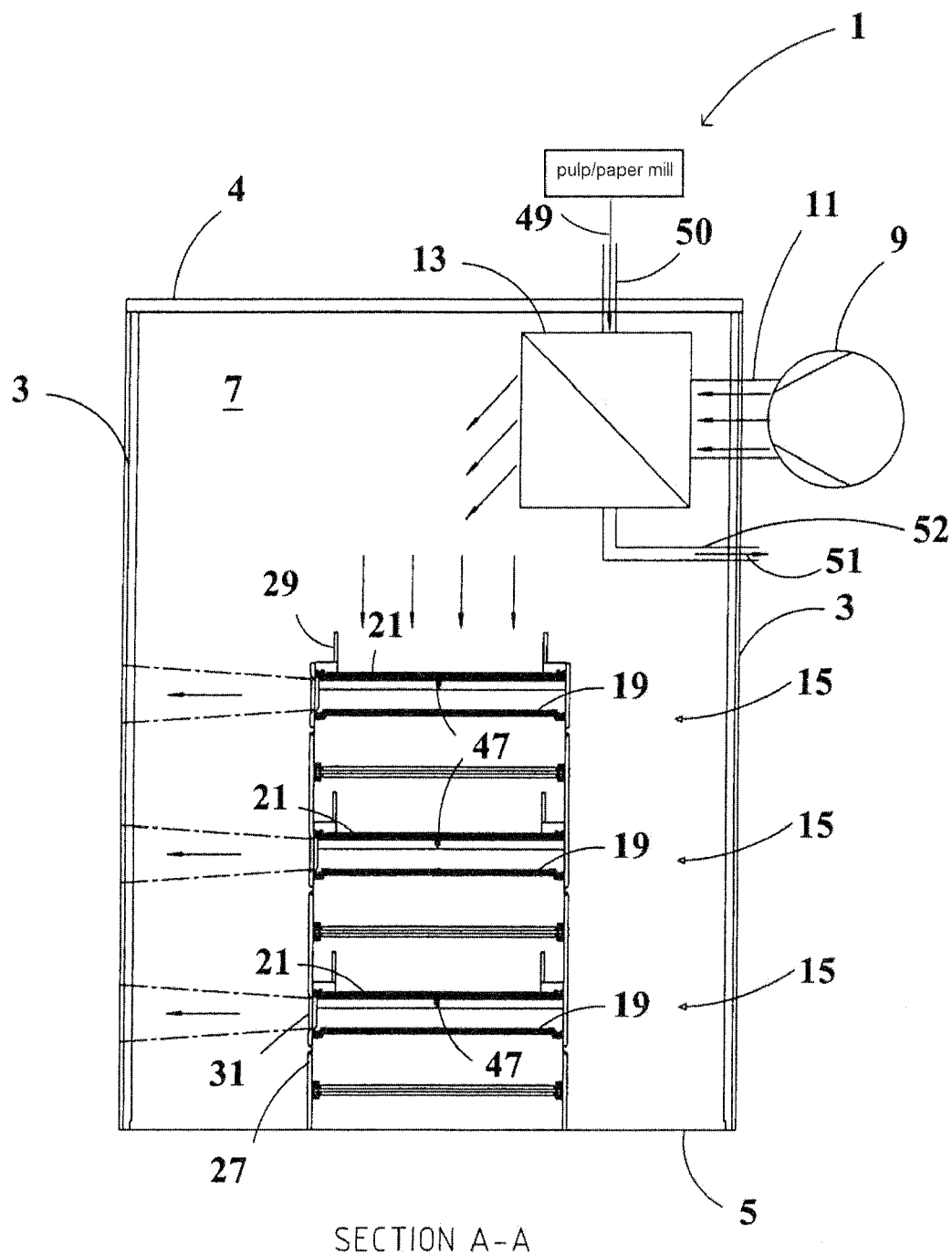
FIG. 4 represents an alternative section of the apparatus in FIG. 1 at a point A.
Figure 5:
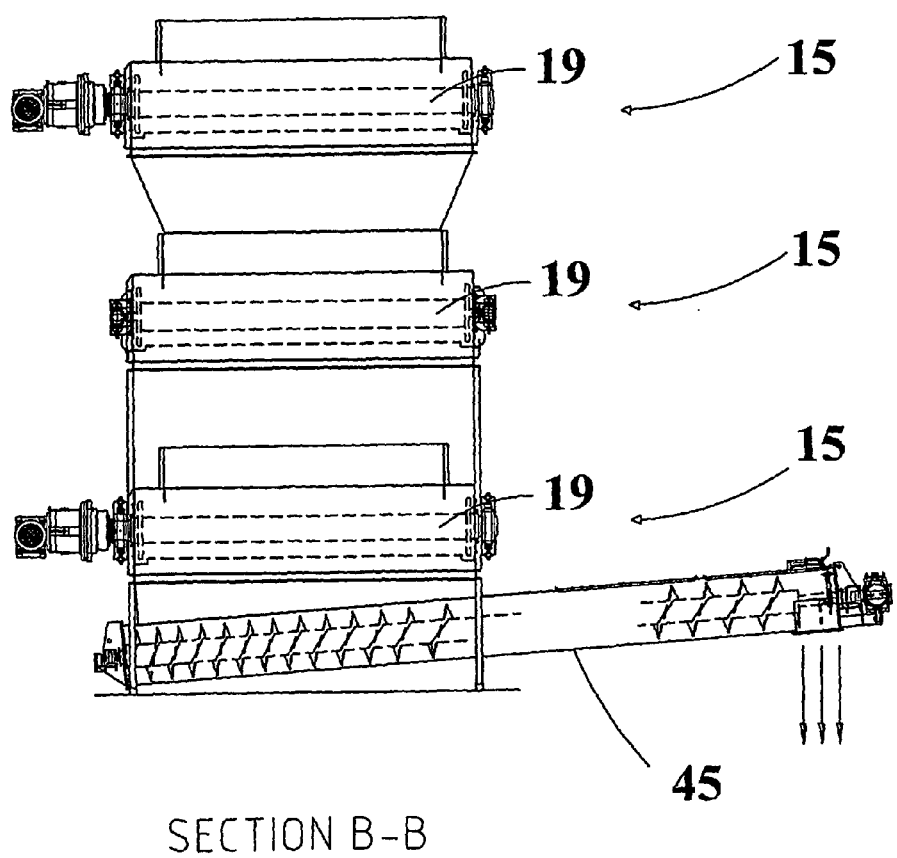
FIG. 5 represents a section of the apparatus in FIG. 1 at a point B.
Figure 6:
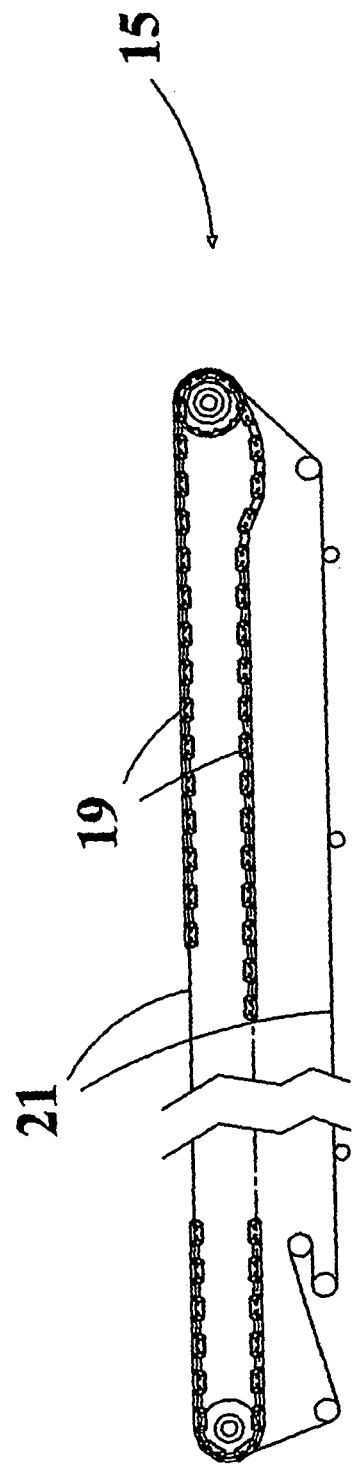
FIG. 6 represents the wire and chain of a drying conveyor according to the invention viewed from the side.

The flows of heated gas through the drying conveyors 15 can be realised in various ways. For example, all overlapping drying conveyors 15 can be built inside a single continuous housing 27 so that gas can flow vertically throughout the entire conveyor structure from the inlet connectors 29 of the topmost conveyor down to the outlet connectors 31 of the lowest conveyor. Separate in- and/or outlet connectors may also be arranged for each drying conveyor 15, if so required. FIGS. 3 and 4 represent two alternative ways of arranging the gas flows.

An inlet pipe 50 for warm waste water 49 to be conducted into a heat exchanger 13 and an outlet pipe 52 for cooled waste water 51 to be extracted from a heat exchanger 13 can be seen in FIGS. 3 and 4.

Figures 7, 8:
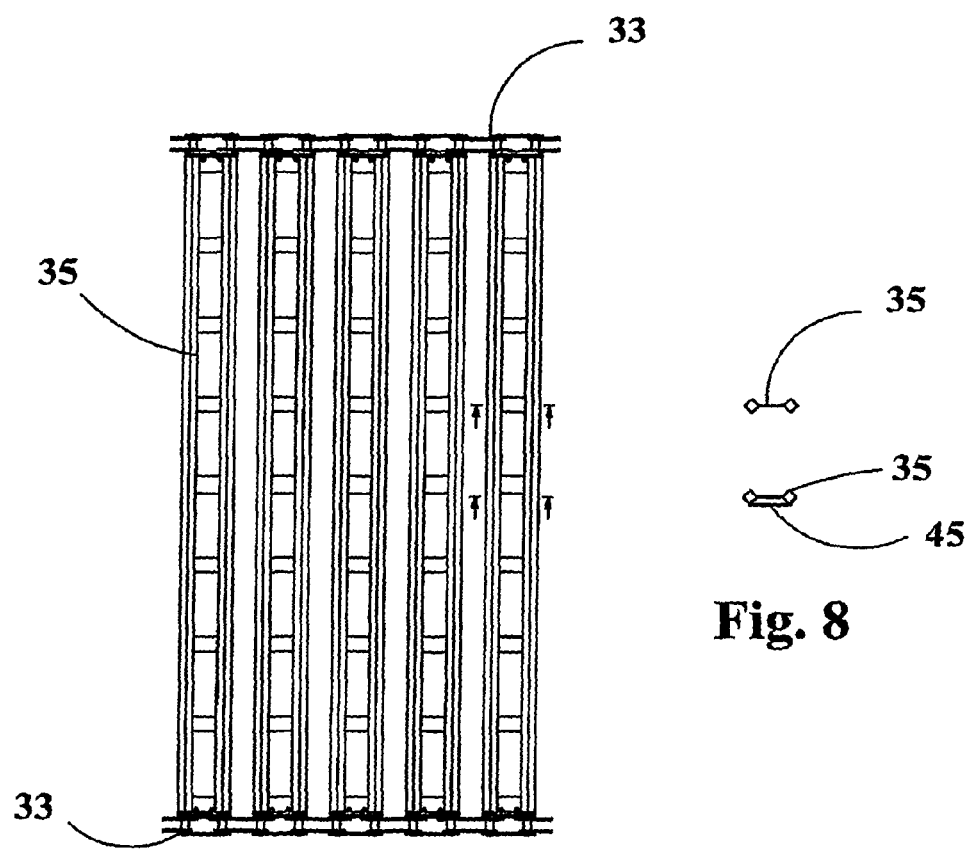
FIG. 7 represents the chains and the support members between the chains of a drying conveyor according to the invention viewed from above.
FIG. 8 represents two cross sections of a support member of the drying conveyor in FIG. 7.

The chain conveyor preferably comprises two chains 33 under the edges of a wire 21 and support members 35 located between the chains 33 at predetermined distances. Some support members 35 have been marked in FIG. 2. They can also be seen well in FIG. 7. FIG. 8 shows two alternative cross sections of the support member 35. The lower cross section represents the centre point of the support member 35, on the bottom of which centre point there is a slide surface 45, i.e. a plate, supported on a support rail 47 parallel to the chain 33. The support rail 47 is visible in FIGS. 2, 3 and 4. Except for the centre point, the cross section of the support member 35 is as shown in the topmost drawing. A centrally located support rail 47 may be necessary, for example, if the wire 21 is very wide.

As can be seen in FIG. 1, there is a storage silo 37 above the drying space 7, to which silo material to be dried is fed by means of a conveyor 39. From the storage silo 37 material to be dried is dosed via a screw conveyor 41 onto a wire 21, at the front end 23 of a drying conveyor. To spread the material as evenly as possible across the entire width of the wire 21, the screw conveyor 41 may be arranged to pivot or move in a crosswise direction relative to the wire 21. A bed of material on the wire 21, the thickness of which bed is shown schematically by FIG. 42, is furthermore levelled by rotating a levelling roller 43 above the wire 21 at its front end 23. After passing through three drying conveyors 15, the material to be dried finally falls onto a screw conveyor 45, which carries the material out of the drying space 7.

The Figures show some embodiments in accordance with the invention. For a person skilled in the art it is obvious that the invention is not restricted to the embodiments presented above, but the invention may be modified within the scope of protection afforded by the claims presented below. The drying apparatus and method can naturally also be used for other bulk materials than fuels. Some possible embodiments of the invention are presented in the dependent claims, and they should not as such be regarded as restricting the scope of protection of this invention.

The invention claimed is:

1. A method for drying bulk material in connection with a pulp or paper production process and for cooling waste water of the pulp or paper production process, the method comprising:
   (a) providing a walled enclosure defining a drying space and including a bulk material inlet for introducing bulk material to be dried into the drying space, a bulk material outlet for discharging dried bulk material from the drying space and a gas discharge connector for discharging drying gas from the drying space,
   (b) positioning at least one drying conveyor within the drying space so that the bulk material conveyed to the drying space through the bulk material inlet is deposited onto one end of the conveyor and the dried material is discharged through the bulk material outlet from an opposite end of the conveyor,
   (c) positioning a heat exchanger within the walled enclosure so that drying gas to be heated is introduced from outside the drying space and heated drying gas from the heat exchanger is discharged into the drying space,
   (d) conveying bulk material to be dried through the bulk material inlet and onto the one end of the at least one drying conveyor located in the drying space,
   (e) introducing a drying gas from a blower positioned outside the enclosure to the heat exchanger located within the drying space,
   (f) bringing heated waste water from the pulp or paper production process into heat exchange relationship with the drying gas introduced into the drying space by the blower to heat the drying gas and discharging the heated drying gas into the drying space of the enclosure while simultaneously cooling the waste water,
   (g) conducting the heated drying gas through the at least one drying conveyor conveying the bulk material to be dried and thereafter discharging the drying gas that has passed through the at least one drying conveyor from the drying space through a gas discharge connector; and
   (e) discharging dried bulk material from the drying space.

2. A method as claimed in claim 1, wherein
   the drying conveyor comprises a chain conveyor which supports and carries along a wire mesh or screen fabric on which the material to be dried is conveyed, and wherein
   step (g) includes conducting the heated gas through the wire mesh or screen fabric and through the material to be dried that is carried on the wire mesh or screen fabric.

3. A method as claimed in claim 2, wherein the drying gas is air.

4. A method as claimed in claim 2, wherein the chain conveyor is operated at a speed of 0.02-0.1 meters per second.

5. A method as claimed in claim 1, wherein the temperature of the heated gas is 35-85° C.

6. A method as claimed in claim 1, wherein the gas is heated by hot waste water in a heat exchanger.

7. A method as claimed in claim 1, wherein the gas is heated in a heat exchanger in the drying space.

8. A method as claimed in claim 1, wherein the bulk material comprises bark, sawdust, pretreated sludge or mixtures thereof.

9. An apparatus for drying bulk material in connection with a pulp or paper production process and for cooling waste water of the pulp or paper production process, the apparatus comprising:
   a dryer for drying the bulk material and for cooling the waste water of the pulp or paper production process, wherein the dyer comprises:
      (i) a walled enclosure defining a drying space and including a bulk material inlet for introducing bulk material to be dried into the drying space, a bulk material outlet for discharging dried bulk material from the drying space and a gas discharge connector for discharging drying gas from the drying space,
      (ii) a heat exchanger positioned within the walled enclosure so that drying gas to be heated is introduced from outside the drying space and heated drying gas from the heat exchanger is discharged into the drying space,
      (iii) at least one blower located outside the drying space arranged to blow drying gas through the enclosure and to the heat exchanger so that heated drying gas is discharged by the heat exchanger into the drying space,
      (iv) waste water connectors for conducting waste water produced in the pulp or paper production process into and out of the heat exchanger, wherein the heat exchanger is arranged to heat the drying gas with the waste water while simultaneously cooling the waste water with the drying gas, and
      (v) at least one drying conveyor located in the drying space so that the bulk material conveyed to the drying space through the bulk material inlet is deposited onto one end of the conveyor and the dried material is discharged through the bulk material outlet from an opposite end of the conveyor, wherein
         the at least one drying conveyor comprises a chain conveyor equipped with a drive apparatus, wherein the chain conveyor includes a pair of spaced-apart chains and support members extending between the pair of chains, and a wire mesh or screen fabric supported by the support members of the chains and running on the chain conveyor such that the heated gas travels through the wire mesh or screen fabric.

10. An apparatus as claimed in claim 9, wherein the wire mesh or screen fabric and the chain conveyor are substantially equal in width.

11. An apparatus as claimed in claim 9, wherein the width of the wire mesh or screen fabric is 2-8 meters.

12. An apparatus as claimed in claim 9, comprising a paper mill having a paper production process, wherein the waste water connectors are arranged to conduct waste water produced in the paper production process of the paper mill into and out of the at least one gas heating device.

13. An apparatus as claimed in claim 9, comprising a pulp mill having a pulp production process, wherein the waste water connectors are arranged to conduct waste water produced in the pulp production process of the pulp mill into and out of the gas heating device.

* * * * *